United States Patent [19]
Conti et al.

[11] Patent Number: 5,291,490
[45] Date of Patent: Mar. 1, 1994

[54] NODE FOR A COMMUNICATION NETWORK

[75] Inventors: Giovanni Conti, Lausanne, Switzerland; James R. Ensor, Red Bank, N.J.

[73] Assignee: AT&T Bell Laboratories, Murray Hill, N.J.

[21] Appl. No.: 837,511

[22] Filed: Feb. 18, 1992

[51] Int. Cl.$^5$ .................. H04L 12/40; H04L 12/48; H04L 12/66
[52] U.S. Cl. ................. 370/85.4; 370/94.1; 370/94.2
[58] Field of Search ............... 370/60, 60.1, 94.1, 370/94.2, 94.3, 85.13, 85.14, 85.4, 85.5; 340/825.05, 825.5, 825.51

[56] References Cited

U.S. PATENT DOCUMENTS

| | | |
|---|---|---|
| 4,930,123 | 5/1990 | Shimizu ........................... 370/94.1 |
| 4,949,337 | 8/1990 | Aggers et al. ..................... 370/85.4 |

OTHER PUBLICATIONS

L. Hughes, "A Multicast Transmission Taxonomy," Proc. of the IFIP WG 10.3 Working Conference on Distributed Processing, Amsterdam, The Netherlands, 5-7 Oct. 1987, pp. 87-102.
B. Rajagopalan et al., "A Token-Based Protocol for Reliable, Ordered Multicast Communication," Proc. of the Eighth Symposium On Reliable Distributed Systems, Seattle, Wash., 10-Oct. 1989, pp. 84-93.
M. S. Atkins et al, "An Efficient Kernel-level Dependable Multicast Protocol for Distributed Systems," Proc. of the Eighth Symposium on Reliable Distributed Systems, Seattle, Wash., 10-12 Oct. 1989, pp. 94-101.

*Primary Examiner*—Wellington Chin
*Attorney, Agent, or Firm*—Gerard A. deBlasi

[57] ABSTRACT

Mechanisms for efficient transmission management are provided for multiparty, multimedia communications by constructing a logical ring structure from logical point-to-point connections between multiple nodes participating in a communication. Data and control information are unbundled in the communication by providing several different higher level protocols or applications, called "user entities," at each node and enabling uninhibited data transfer between corresponding user entities of the different nodes via virtual rings built on top of the logical ring. A mechanism preferably is provided for a user entity to selectively accept or reject a packet on the basis of the importance of the information contained in the packet.

17 Claims, 6 Drawing Sheets

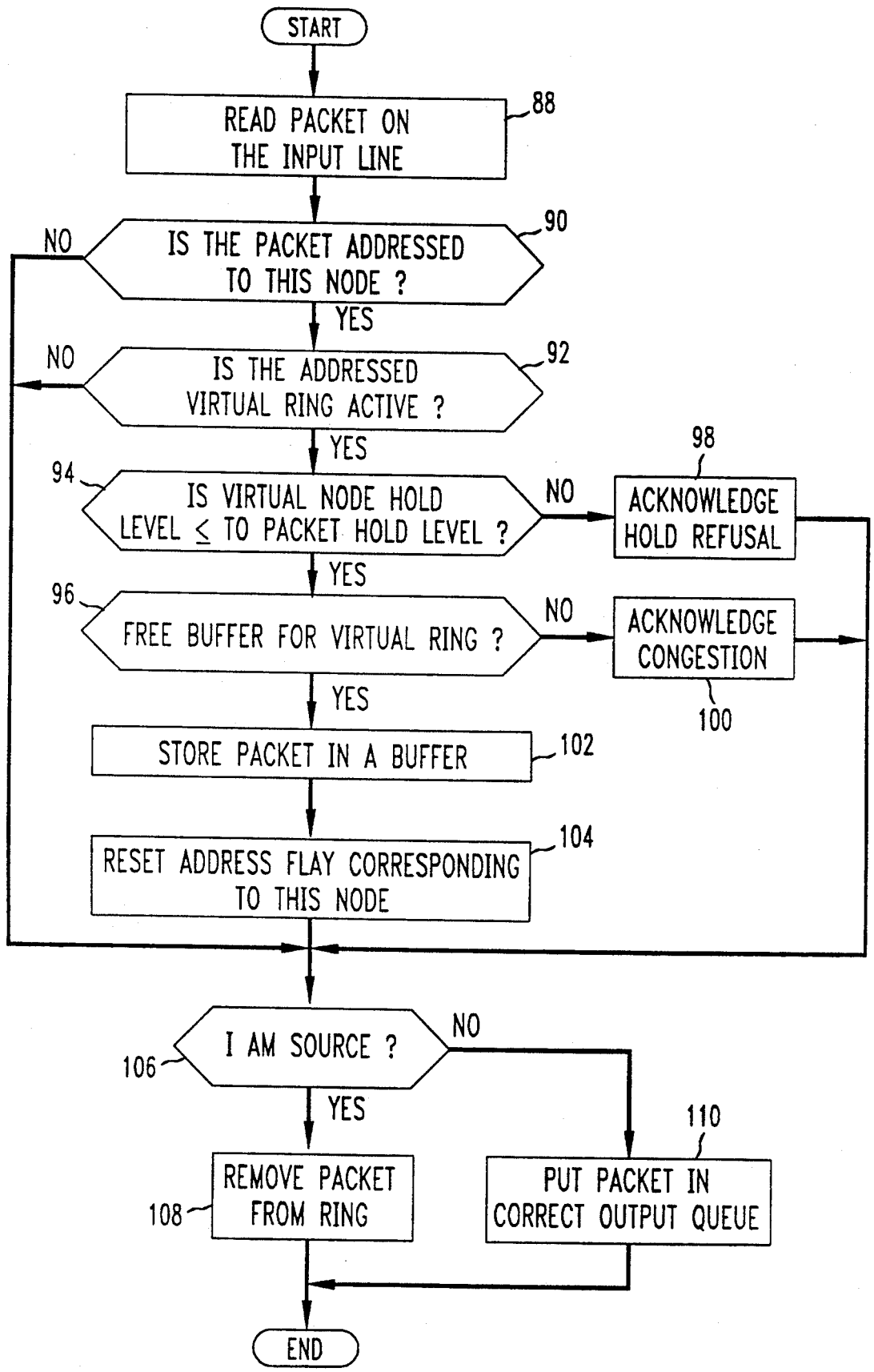

NODE FOR A COMMUNICATION NETWORK

TECHNICAL FIELD

This invention relates to nodes for communication networks and, more particularly, to nodes for packet communication networks used for multimedia communications.

BACKGROUND OF THE INVENTION

Communication networks have been designed for campus, corporate, and metropolitan environments. These networks are realized in various topologies, for example, ring, star, and bus. Generally, the network regardless of topology consists of a plurality of nodes physically interconnected by wire, coaxial cable, or optical fiber to form the network. Since interconnections of nodes to the network are physical or "hardwired," such networks lack the robustness of design sufficient to allow communication with nodes not physically interconnected on the network. That is, only those nodes physically connected in the network are allowed to communicate among themselves.

Each node in the network represents a network user which has the capability for running a variety of applications and a variety of terminal or communications devices. The applications and devices within a particular node are commonly referred to as user entities. In a multimedia communication environment, user entities may include graphics display devices, text input and text display devices, video devices, facsimile devices, communications handling and administration devices, and the like. When the communication protocols of the network require nodes to communicate via packets, communication for graphics for video types of user entities involve significantly more data and, therefore, more packets than text or communications handling types of user entities. As a result, it is possible and highly probable that the packet traffic destined for one type of user entity at a particular node may congest and overflow the provisioned buffering facilities at that node. In turn, this causes other packet traffic destined for the remaining user entities at the particular node to be ignored or discarded thereby adding overhead retransmission packet traffic to the network.

Existing nodes for such networks offer the capability of setting a single priority threshold on all packet transmissions destined for the node regardless of the particular user entity which will receive the packet. The priority threshold allows the node to ignore all packets whose priority fails to meet or exceed the specified priority threshold for that node. While such an approach permits "screening" of packets and thereby offers a mechanism for congestion reduction at the node, it unfairly locks all user entities into receiving only those packets having a sufficiently high priority to meet or exceed the threshold. There is no ability to permit selected user entities to receive packets whose priority is less than the threshold set in the node.

SUMMARY OF THE INVENTION

Efficient transmission management is provided for multiparty, multimedia communications by constructing a logical ring structure from logical point-to-point connections between multiple nodes participating in a communication. The logical ring provides the advantages of a physical ring yet increases flexibility by permitting nodes to be interconnected regardless of the physical interconnection media.

Data and control information are unbundled in the communication by providing several different higher level protocols or applications, called "user entities," at each node and enabling uninhibited data transfer between corresponding user entities of the different nodes. This unbundling permits a connection control mechanism to be used with multiple data transport media in a single connection. Thus, for example, packets carrying video data do not interfere with packets carrying audio data or connection control data. User entities of one node communicate with corresponding user entities of another node via virtual rings built on top of the logical ring. The virtual rings are built by multiplexing over the logical ring packets originated by the different user entities within a node.

In another embodiment of the invention, a mechanism is provided for each user entity to selectively accept or reject a packet on the basis of the importance of the information contained in the packet. A "packet hold level" is associated with each packet to indicate the packet's relative importance. Associated with each user entity at each node is a threshold hold level. A packet addressed to a given user entity having a packet hold level greater than or equal to the threshold hold level for the addressed user entity is transmitted to that user entity. Otherwise, the packet is not transmitted to the user entity. Different user entities connected to a given node may have different threshold hold levels.

BRIEF DESCRIPTION OF THE DRAWINGS

In the drawings:

FIGS. 11 and 12 are flowcharts illustrating the steps by which a packet is transmitted and received, respectively.

DETAILED DESCRIPTION

A logical dual ring architecture is implemented in accordance with the principles of the present invention by forming logical point-to-point connections between pairs of nodes participating in the logical ring. The use of point-to-point logical links to form the logical ring enables connectivity among nodes in a communication across different physical media. The ring topology enables efficient transmission management and provides a mechanism for fault recovery.

Coupled to each node are multiple higher level protocols or applications, which are referred to as "user entities." Each user entity typically controls a different communication media or control mechanism. Packets transmitted between corresponding user entities at the different nodes are multiplexed over the logical ring to create independent virtual rings. Data and connection control information are transmitted on different virtual rings, thus unbundling data and connection control information in the communication.

Figure 1:
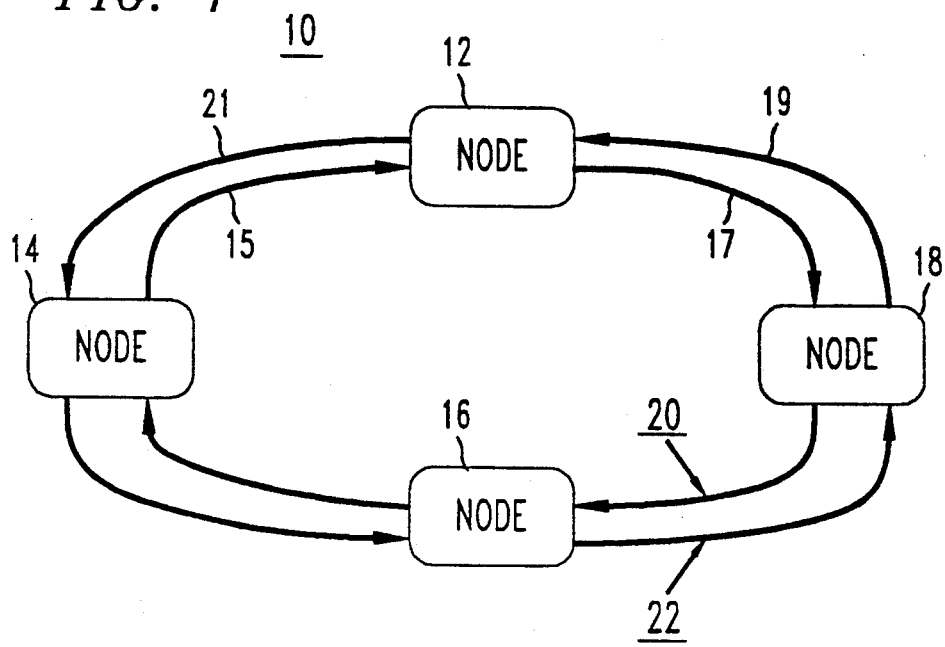
FIG. 1 is block diagram of the logical ring architecture in accordance with the principles of the present invention showing dual ring operation.

With reference to the drawings, FIG. 1 shows a logical dual ring architecture 10 having nodes 12, 14, 16, and 18. A given node communicates directly only with the two nodes to which it is linked via a point-to-point connection. For example, node 12 communicates directly only with nodes 14 and 18. Thus, for example, there is no direct communication between nodes 12 and 16.

Data packets pass between the nodes in one direction on an internal ring 20 and in the other direction on an external ring 22. For example, packets pass from node 14 to node 18 through node 12 on internal ring 20 as indicated by arrows 15 and 17. Packets pass from node 18 to node 14 on external ring 22 as indicated by arrows 19 and 21. A packet is passed along an internal or external ring from one node to the next adjacent node, around the entire logical ring, until the packet returns to the node from which the packet originated (the "originating node").

Figure 2:
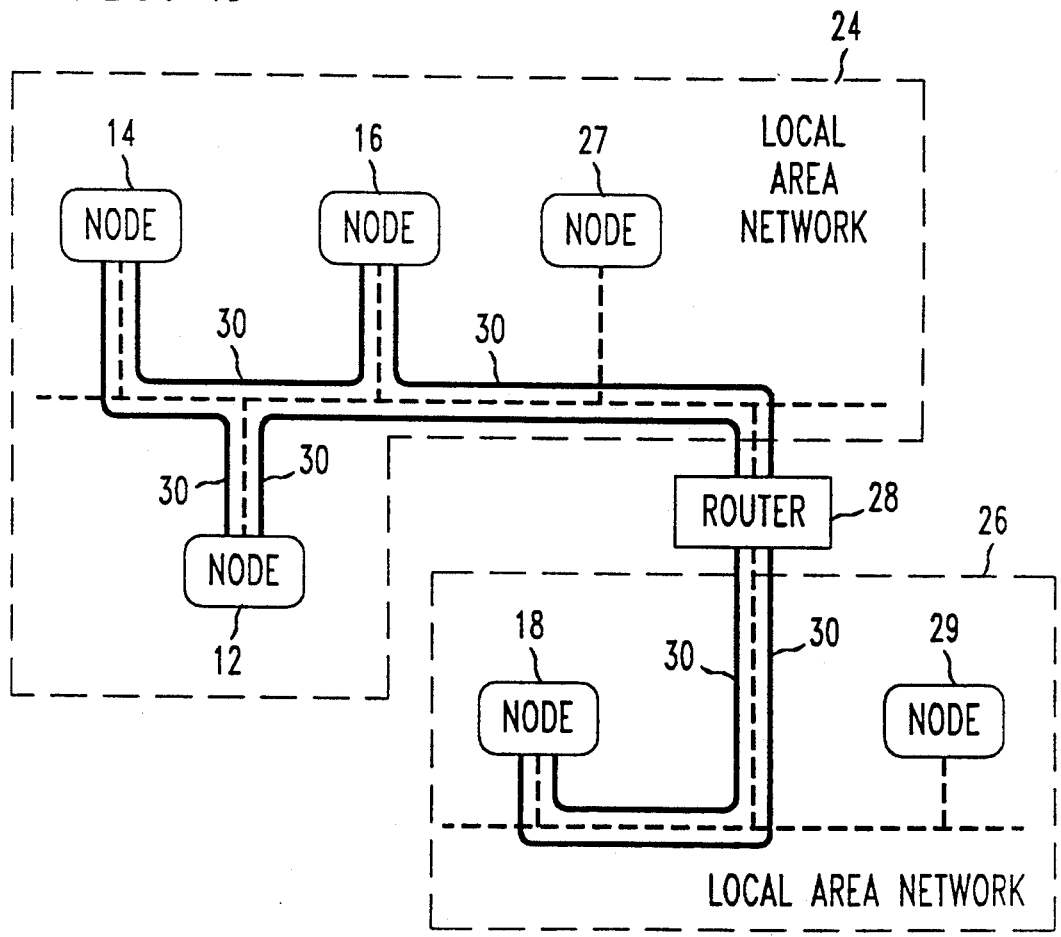
FIGS. 2 and 3 are block diagrams of illustrative physical implementations of the logical dual ring of FIG. 1.

FIG. 2 shows two local area networks (LAN) 24 and 26 coupled by a router 28. LAN 24 includes nodes 12, 14, 16, and 27. LAN 26 includes nodes 18 and 29. Logical ring 10 is built on top of LANs 24 and 26 by point-to-point communications between adjacent nodes in the ring. Logical ring 10 can be formed even if LANs 24 and 26 are of different types. Predetermined nodes within LAN 24 are coupled to each other and with predetermined nodes within LAN 26 by point-to-point links 30 to implement the logical dual ring of FIG. 1. More particularly, point-to-point links 30 are established between node 18 of LAN 26 and nodes 12 and 16 of LAN 24. Nodes 12 and 16 also connect to node 14 by point-to-point links 30 to complete logical ring 10.

Point-to-point links 30 are implemented between nodes of a LAN by causing each node to address all packets to either of two other nodes. For example, in FIG. 2, node 12 is caused to address packets only to either node 14 or node 18. Node 14 is caused to address packets only to either node 12 or node 16. The dual nature of the logical ring of FIG. 1 is implemented by transmitting data packets between a pair of nodes in one direction to implement internal ring 20, and in the other direction to implement external ring 22.

FIG. 2 shows that not all nodes of LANs 24 and 26 need be included in logical ring 10 of FIG. 1. In particular, node 27 of LAN 24 and node 29 of LAN 26 are omitted from the logical ring formed by the connections of FIG. 2. Point-to-point links 30 enable the selective coupling and, therefore, the selective exclusion of nodes within a LAN.

Figure 3:
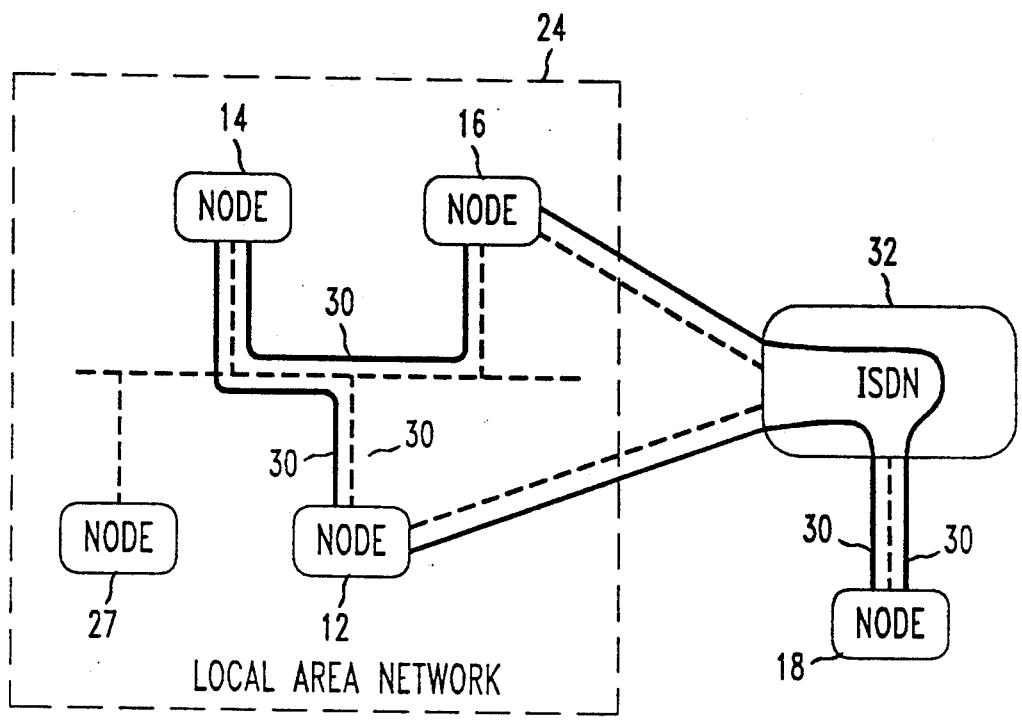

FIG. 3 shows an alternative embodiment of logical ring 10 of FIG. 1. FIG. 3 shows a logical dual ring that is formed using predetermined nodes of LAN 24 and a node 18 coupled to nodes of LAN 24 via a circuit-switched connection, illustratively ISDN telephone lines 32. In particular, point-to-point links 30 connect nodes 12 and 16 of LAN 24 with node 18. Nodes 12 and 16 use LAN 24 to connect to node 14 to complete the logical ring. As previously described with respect to the dual LAN system of FIG. 2, not all nodes of LAN 24 are required to participate in the multiparty communication. For example, FIG. 3 shows that node 27 of LAN 24 has been omitted from the logical ring.

Point-to-point links 30 are implemented via a circuit-switched network as an ordinary telephone call. The dual nature of the logical ring of FIG. 1 is achieved by establishing full duplex connections between each pair of neighboring nodes. Alternatively, two half duplex connections are formed between each pair of neighboring nodes.

FIGS. 2 and 3 illustrate that as long as connectivity can be provided between two nodes, the physical support used to provide the connectivity has no bearing upon the logical ring topology. One skilled in the art will readily appreciate the applicability of the present invention in a wide area network. More particularly, point-to-point logical links may be used in accordance with the principle of the present invention to form a temporary logical ring of nodes via switches in the telephone network.

Figure 4:
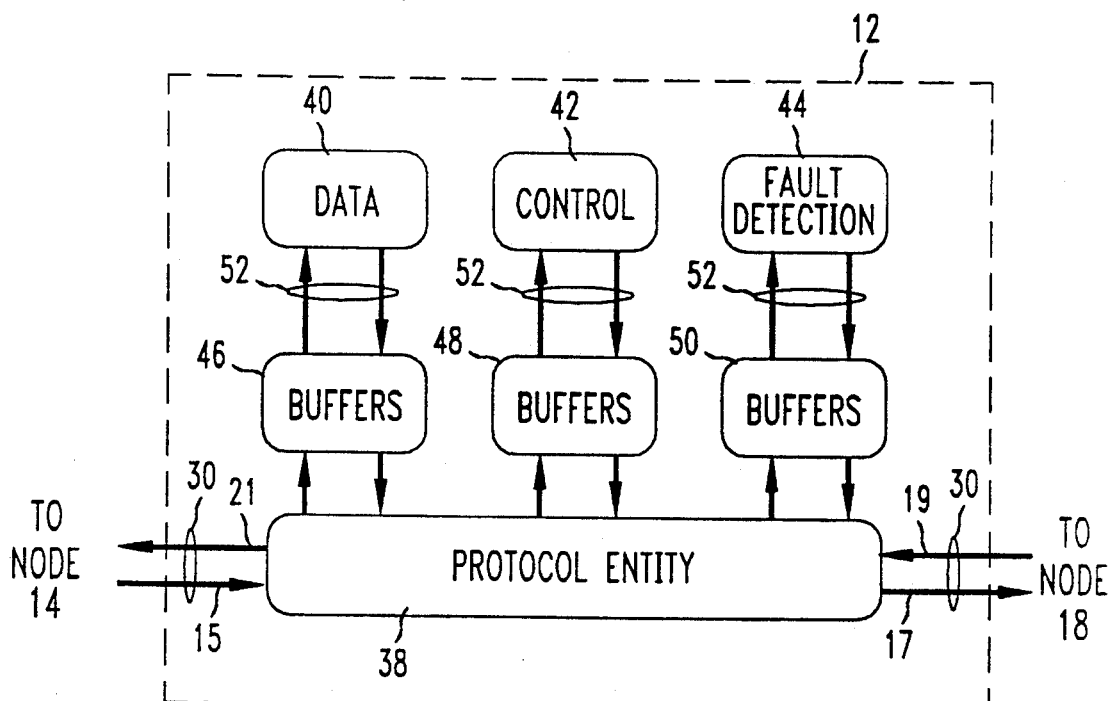
FIG. 4 is a block diagram of an illustrative node of FIG. 1.

FIG. 4 shows an exemplary structure of a node, illustratively node 12. Node 12 includes a protocol entity 38, several user entities 40, 42, and 44, and data buffers 46, 48, and 50. Protocol entity 38 is the unit within node 12 that executes the protocol of the present invention. As described further below, the user entities constitute whatever is being run on top of the protocol entity, whether it be a protocol layer or an application. Buffers 46, 48, and 50 store data passed between protocol entity 38 and the user entities. Buffers 46, 48, and 50 are allocated exclusively to user entities 40, 42, and 44, respectively. Buffers 46, 48, and 50 physically may be part of protocol entity 38 or part of its respective user entity. Data pass between protocol entity 38 and the user entities (through the buffers) via service access points 52.

User entities 40, 42, and 44 do not communicate directly with other nodes but rather must communicate indirectly via protocol entity 38, through the buffer allocated exclusively to the respective user entity. The user entities access protocol entity 38 via primitives. Each of user entities 40, 42, and 44 has its own independent access to protocol entity 38. Consequently, primitives from one user entity are not blocked by primitives of another user entity.

As mentioned above, the user entities constitute whatever is being run on top of protocol entity 38, whether it be a protocol layer or an application. Examples of user entities 40, 42, and 44 are the user data entity, the connection control entity, and the fault detection entity. Other user entities could be provided, for example, for voice and video information.

Data transfer and control information are unbundled in accordance with the invention by providing several logical rings which are built on top of logical ring 10 of FIG. 1. Unbundling of data and control permits a connection control mechanism to be used with multiple data transports in a single connection. The logical rings are referred to as "virtual rings." Virtual rings operate independently of one another. The only interference between virtual rings occurs in the sharing of the bandwidth of logical ring 10. Moreover, because each user entity is allocated its own buffer space (see FIG. 4), one user entity is prevented from dominating data transfers through protocol entity 38.

Figure 5:
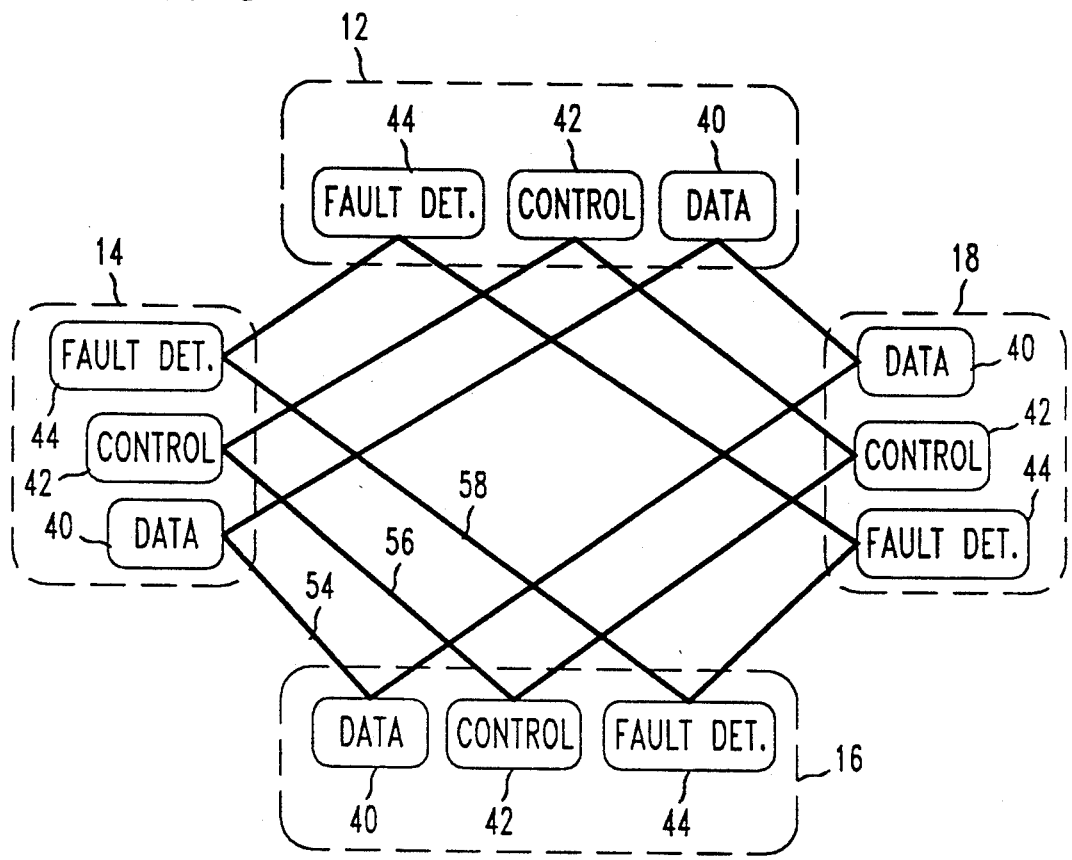
FIG. 5 is a block diagram of three illustrative virtual rings which are built on the logical dual ring of FIG. 1.

FIG. 5 shows three virtual rings 54, 56, and 58, each virtual ring coupling a user entity of one node to the corresponding user entities of other nodes. Virtual ring 54 is provided to couple "data" user entity 40 of node 12 to data user entities 40 of nodes 14, 16, and 18. Virtual ring 56 is provided to couple the "connection control" user entities 42 of the four nodes. Similarly, virtual ring 58 is provided to couple the "fault detection" user entities 44 of each node.

Virtual rings permit many concurrent communications, between respective user entities of the different nodes, to be multiplexed over a single logical ring 10. Thus, each node can simultaneously run many applications or protocols on top of the same logical ring, accessing the logical ring via different service access points 52. Virtual rings are assigned a virtual ring number which, as described more fully below, becomes part of the packet addressing mechanism. Thus, there can be at most one service access point 52 in each node connected to the same virtual ring. A user entity, or perhaps several user entities, couple to each service access point 52.

The methods and apparatus of the present invention do not incorporate mechanisms for connection control or flow control. Rather, independent and modular "lightweight" protocols can be designed to run on the virtual rings to perform these functions and to run as user entities. The connection control entity, for example, is a higher level protocol which handles connection control for the node to which it is attached. Because the virtual rings operate independently of one another, the lightweight protocols do not interfere with each other.

When a user entity wants to transmit a packet, the user entity requests protocol entity 38 of the node to transmit the packet. Protocol entity 38 then constructs a packet for transmission.

Figure 6:
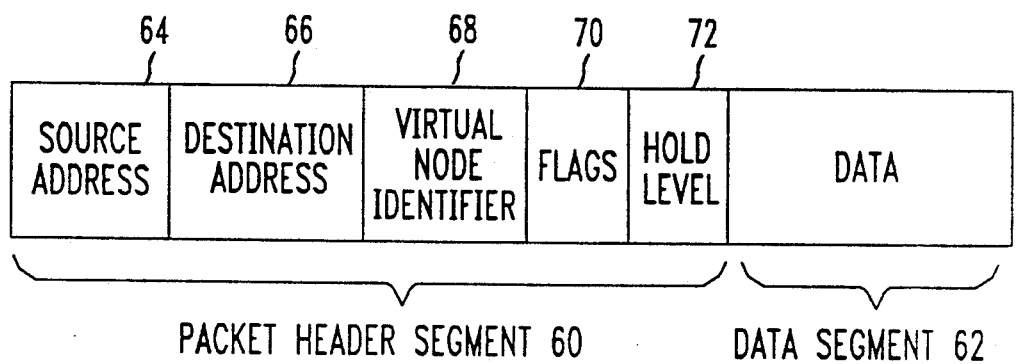
FIG. 6 is a block diagram of the structure of an illustrative packet for transmission between the nodes of FIG. 1.

FIG. 6 shows an exemplary packet format. The packet includes a control segment, illustratively, a packet header segment 60, and a data segment 62. Packet header segment 60 contains the required protocol information. More specifically, packet header segment 60 includes a source address field 64, a destination address field 66, a virtual ring identifier 68, various flags 70, and a hold level field 72. Data segment 62 includes the payload of the packet. That is, data segment 62 includes the information received by a protocol entity 38 from a user entity. It will be apparent to one skilled in the art that various modifications can be made to this format, such as providing a packet trailer to hold certain fields presently contained in packet header segment 60, without departing from the spirit of the invention.

Source address field 64 indicates the node originating the packet. The source address value preferably is passed to the user entities, as many protocols make use of this information. The source address also is used to remove a packet from the logical ring once the packet has completed a full circle around logical ring 10.

Destination address field 66 comprises an array of pairs of flags. As described further below with regard to the addressing scheme, each pair of flags in the array corresponds to a single node in logical ring 10. Destination address field 66 can be either fixed or variable in size. A fixed size field sets a maximum number of nodes in logical ring 10. A variable size field provides additional flexibility in determining the maximum number of nodes in logical ring 10. If the destination address field is variable in size, a cardinal value indicates the current size of the vector.

The contents of virtual ring identifier field 68 indicate the virtual ring to which the packet belongs. That is, the virtual ring identifier indicates the service access point 52 on which the packet will travel. The virtual ring identifier enables data transferred from many user entities to be multiplexed over the same logical ring.

Among the flags 70 included in packet header segment 60 are flags designated as the "ring" flag and the "remove" flag. The value of the ring flag indicates whether the packet was originated on internal ring 20 or on external ring 22 of logical ring 10. The remove flag, if set, indicates that the packet should be removed from logical ring 10 by the node that originated the packet. These flags are used by a node originating a packet to correctly transfer packets on the ring regardless of the state of logical ring 10. That is, regardless of whether the ring is operating as a dual ring or as a single ring, as described below.

Hold level field 72 carries a value indicative of the hold level of the packet. The hold level of the packet is defined by the user entity originating the packet. As described below, the hold level field is used to determine whether a particular packet is of sufficient importance to be received by the nodes to which the packet is addressed.

Packets may be transmitted on logical ring 10 by a node using one of three different addressing modes: unicast, selective multicast, or broadcast. Unicast mode is used to transmit packet to only a single node of logical ring 10. Selective multicast node is used to transmit a packet to selected ones of the nodes on logical ring 10. Broadcase mode is used to transmit a packet to all nodes of logical ring 10.

Packets are selectively addressed to predetermined nodes of logical ring 10 in accordance with the invention by setting one or more flags within destination address field 66. Each flag in destination address field 66 corresponds to a different node on logical ring 10.

Figure 7:
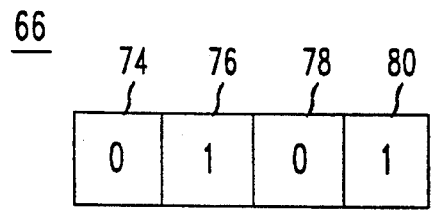
FIGS. 7 and 8 are block diagrams of the bit fields of an illustrative destination address field of the packet of FIG. 6.

FIG. 7 shows an exemplary bit field implementing destination address field 66. The bit field of FIG. 7 includes four flags 74, 76, 78, and 80, which correspond respectively to nodes 12, 14, 16 and 18. In this illustration, it is assumed that node 12 is transmitting a packet only to nodes 14 and 18. Hence, bits 76 and 80, corresponding to nodes 14 and 18, are set. The bit 78 corresponding to node 16 is not set, because node 16 is not an intended recipient of the packet. As the packet is transmitted from node to node around logical ring 10, each node checks the packet header of the transmitted packet to determine whether the node is to receive the packet. That is, each node checks to see whether the bit of the destination address field that corresponds to itself is set. If the node is not intended to receive the transmitted packet, the corresponding bit will not be set, and the node simply re-transmits the packet to the next node along the ring. If the bit is set, the node copies the packet into an appropriate buffer, as further described below.

Figure 8:
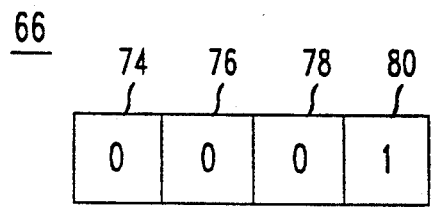

If a node successfully receives a packet that is addressed to it, the node indicates packet reception by resetting the bit in the packet destination address field that corresponds to that node. The node then retransmits the packet to the next node along logical ring 10. If a node is an intended recipient of a packet but is unable to receive the packet, the node does not reset its respective bit in the destination address field of the packet. Thus, when the packet returns to the originating node after passing completely around the loop, the originating node can determine from any bits that remain set in the destination address field which nodes did not successfully receive the packet. FIG. 8 illustrates this feature of the invention.

FIG. 8 shows the contents of destination address field 66 for the example of FIG. 7, after the packet has returned to the originating node. Node 18 had not received the packet in the example above, so its respective bit in the destination address field remains set. On the other hand, node 16 successfully received the packet in the example above, so its respective bit in the destination address field is reset. The user entity of the originating node can now retransmit the packet to those nodes that were unable to receive the packet during the first transmission, using the data contained in destination address field 66 as modified by the nodes that successfully received the packet.

A second flag for each node (not shown) typically may be provided in destination address field 66 for reporting to the originating node the reason of non-reception of a packet by any intended destination. This flag is illustratively referred to as the "refusal reason" flag. If the refusal reason flag is set, the packet has been refused because there is insufficient buffer space within the addressed node to store the packet. If the refusal reason flag is reset, the packet has been refused because the packet hold level is lower than the virtual node hold level at the addressed node. The refusal reason flag for a node only has meaning if the corresponding address bit flag of FIGS. 7 and 8 remains set after the packet passes completely around logical ring 10.

In accordance with the invention a hold level is assigned to each packet (the "packet hold level"). The hold level permits user entities to receive selectively packets addressed to the user entity. A hold level is assigned at each node for each virtual ring (the "virtual node hold level"). The virtual node hold level acts as a threshold on the packet hold level. Packets that have a lower hold level than the virtual node hold level will not be received by the node and, thus, will not be received by the user entity on the respective virtual ring. The protocol entity of each node maintains a table of hold levels, one for each user entity interacting with the protocol entity. That is, the protocol entity of each node maintains a table of hold levels for each virtual ring on which the node communicates.

Each user entity at a given node has a separate hold level associated with it. Thus, predetermined ones of the user entities at a given node may have higher hold levels than other user entities at the same node. For example, node 12 may assign a higher hold level to video data than to voice data. In this instance node 12 may receive all packets carrying voice data yet may only receive video data deemed by an originating node to be of higher priority.

The hold level of the present invention serves two important functions. First, the hold level provides a mechanism for distinguishing between data of different importance on a single virtual ring. Second, the hold level provides a mechanism for independently controlling the virtual rings. These functions are described in greater detail below.

The hold level provides a mechanism for notifying a party of important (i.e., high hold level) events, even if that party chooses not to receive all data related to the communication. Thus, the hold level distinguishes between data of different importance. For example, assume that packets carrying normal video data and packets carrying a signal indicating that data will be encoded using a new encoding scheme are transmitted on the same virtual ring. Packets carrying normal video data may be assigned a packet hold level of two, for example, and the packets signalling a new encoding scheme may have a packet hold level of five. Thus, the user entity receiving both packets may specify a virtual node hold level of three to receive notification of the change of encoding scheme while blocking normal video data transmission.

At each node, a different hold level is specified for each virtual node (user entity). Thus, the hold level provides a mechanism for independently controlling packets transmitted on different virtual rings. In this manner, the hold level permits control functions to be unbundled from the data. For example, a very low hold level can be selected at a given node for packets containing control information transmitted on the control virtual ring, while a relatively high hold level is selected at that node for packets containing a video data. Thus, for example, a first party can chose to be notified that a second party has entered or left the communication, even though the first party chooses not to receive any video data.

It is to be understood that the hold level of the present invention should be distinguished from systems in which low priority packets are always delivered if the user entity is ready to receive and no high priority packets are queued. The hold level of the present invention prevents a user entity from receiving packets even when the user entity is ready to receive. Thus, the hold level enables selective reception of packets on the basis of packet importance. The hold level does not imply an order of delivery of the packets to the user entity, nor does it cause higher hold-level packets to be received first.

Packet reception is defined as the attempt to take an allocated buffer, copy a transmitted packet into the allocated buffer, and pass the buffer to the user entity that corresponds to the virtual ring number of the packet. Packet reception is said to succeed if the storage of the packet in the allocated buffer has been performed without problems, even if the packet has not yet been passed to the user entity (e.g., the packet is queued). Otherwise, packet reception is said to have failed. From the foregoing description it can be seen that a packet is received in a node if two conditions are satisfied. First, the hold level designated in the packet control segment is greater than or equal to the hold level threshold established by the user entity intended to receive the packet. Second, there is an allocated buffer available to store the packet. If either of these conditions is not met, the packet cannot be received in the node.

The present invention provides means for recovering from faults in logical ring 10. As described above, logical ring 10 operates as a dual ring under normal conditions. However, if a fault occurs on the ring either in a point-to-point link 30 or at a node, user entities can cause logical ring 10 to continue to operate by switching to single ring mode. The user entities accomplish this by causing two nodes in logical ring 10 to loop back packets as described below. Thus, reliability is increased. Single ring mode causes a packet transmitted, for example, on internal ring 20 to be looped back on external ring 22.

Figure 9:
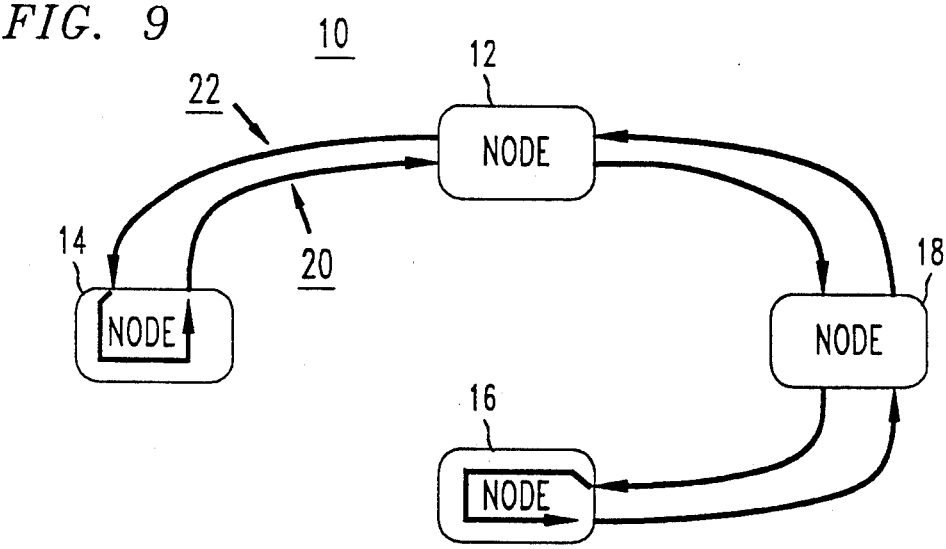
FIGS. 9 and 10 are block diagrams of the logical ring of FIG. 1 illustrating single ring operation.
Figure 10:
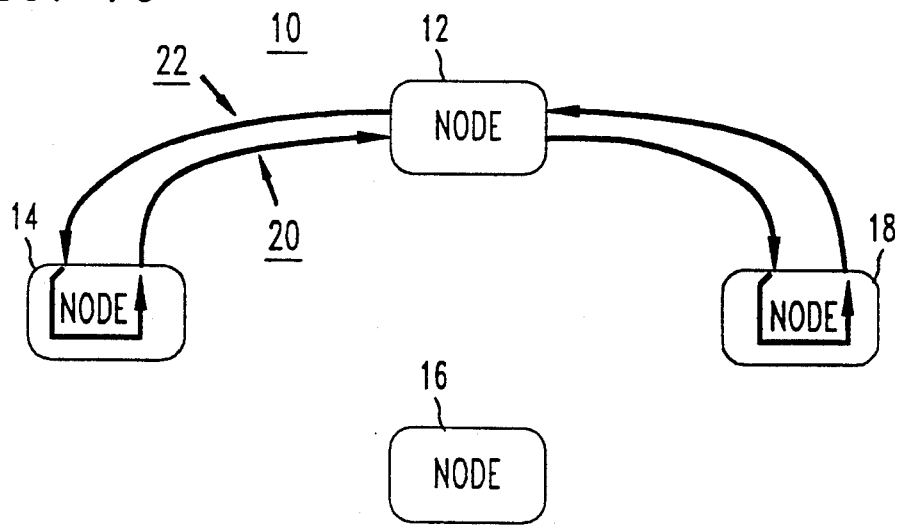

Examples of single ring mode operation are shown in FIGS. 9 and 10. FIG. 9 shows logical ring 10 after a fault occurs occurring on the point-to-point link between nodes 14 and 16. Nodes 14 and 16 each operate to loop back the incoming data, thus forming a single ring. Similarly, FIG. 10 shows logical ring 10 after a fault on node 16. The faulty node is isolated and the two adjacent nodes operate to loop back the signal.

Line and node faults could occur, for example, when a node is dropped from logical ring 10 as a result of a party leaving the communication. In the dual ring mode, a packet is transmitted and received on the same ring (internal or external). However, if the packet comes back on the other ring, the originating node assumes that the ring is operating in the single ring mode.

If a packet comes back to an originating node on the same ring that it was sent out on, the originating node removes the packet from the ring. If the packet returns to the originating node on the other ring, further decision-making is required. In this instance, if the originating node is operating to loop back the packet, the originating node removes the packet from the ring. If the originating node is operating the pass packets on the same ring as the packets are received, the originating node retransmits the packet on the same ring as the packet was received. The second time the packet comes back, the originating node removes the packet from the ring. Flags 70 are provided in packet header segment 60 to indicate on which ring the packet was transmitted and whether this is the first or second transmission.

Figure 11:
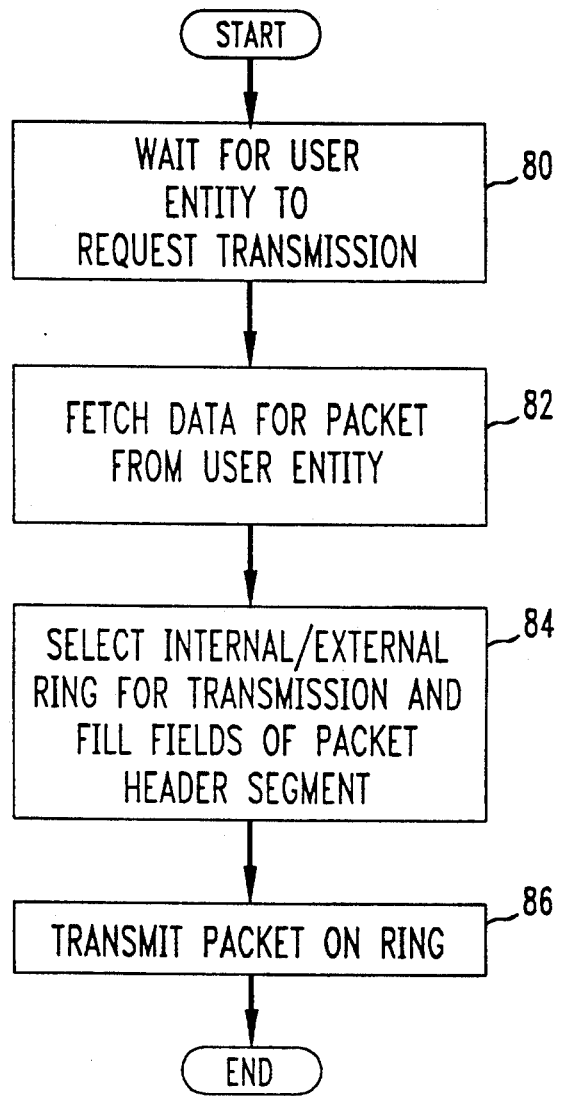

The methods for sending and receiving a packet in logical ring 10 of FIG. 1 are summarized in the flowcharts of FIGS. 11 and 12. FIG. 11 describes the process by which protocol entity 38 receives a packet from a user entity and transmits the packet on logical ring 10. FIG. 12 summarizes the process by which protocol entity 38 receives a packet from logical ring 10 and forwards the packet, if necessary, to other nodes on the ring.

With reference to FIG. 11, protocol entity 38 of an originating node waits for a user entity at that node to request a packet transmission (box 80). Protocol entity 38 then fetches the data for the packet from the requesting user entity (box 82). Protocol entity 38 then selects either internal ring 20 or external ring 22 to transmit the packet and provides the required information to the appropriate fields of packet header segment 60 (box 84). Protocol entity 38 then transmits the packet or buffers the packet for transmission (box 86).

With reference to FIG. 12, protocol entity 38 receives a packet from logical ring 10. Protocol entity 38 waits for a packet from either internal ring 20 or external ring 22 (box 88). Upon receipt of a packet, protocol entity 38 determines whether the received packet is addressed to the node of that protocol entity (box 90). If the packet is not addressed to the protocol entity, processing continues at box 106, as described below. If the packet is addressed to the protocol entity, the protocol entity determines whether the virtual ring to which the packet belongs is active for that node. If the virtual ring is not active, processing then continues at box 106. If the virtual ring is active, protocol entity 38 determines whether the packet hold level is greater than or equal to the virtual node hold level (box 94). If the packet hold level is at least equal to the virtual node hold level, protocol entity 38 determines whether there are any available buffers allocated to that virtual ring (box 96). If the packet hold level is too low or no allocated buffers are available, the packet is not stored and appropriate steps will be taken to report hold level or congestion refusal, as shown in boxes 98 and 100, respectively. In this instance, processing will then continue at box 106. If an allocated buffer is available (box 96), protocol entity 38 stores the packet in the buffer, thus passing the packet to the user entity (box 102). Protocol entity 38 then resets the appropriate flag in the destination address field to indicate successful packet reception (box 104). The protocol entity next determines whether the packet originated at that node (box 106). If the packet originated at that node, protocol entity 38 removes the packet from logical ring 10 thus ending packet processing (box 108). Optionally, protocol entity 38 reports the transmission result to the user entity connected to that virtual ring. Otherwise, protocol entity 38 forwards the packet to the next node along logical ring 10 (box 110).

It will be understood that the foregoing is merely illustrative of the principles of the invention, and that various modifications can be made by those skilled in the art without departing from the scope of the invention. For example, the point-to-point logical links forming logical ring 10 could be implemented using satellite transmission, dedicated communication links, or any other suitable communication media. Moreover, although the invention has been described in the context of a ring topology, it will be apparent to one skilled in the art that various aspects of the invention are equally applicable to other topologies, such as, for example, star and bus topologies. The scope of this invention is limited only by the claims that follow.

We claim:

1. An arrangement for communicating among a plurality of nodes in a packet network wherein each node connects a plurality of user entities to the network, the arrangement comprising:

means for receiving a packet including a data segment and a control segment, the data segment including information selected from the group consisting of connection control information and data information, the receiving means including means for routing the data segment of a received packet to a predetermined one of the plurality of user entities in response to the control segment of the received packet;

first and second service access point means coupled to the receiving means, the first service access point means passing the data segment between the receiving means and a first user entity of the plurality of user entities and the second service access point means passing the data segment between the receiving means and a second user entity of the plurality of user entities; and first and second buffer means for storing the data segments of received packets routed via the respective service access point means to the first and second user entities, respectively, so that the arrangement effectively reduces the number of packets discarded by at least one of the plurality of nodes.

2. The arrangement as defined in claim 1 wherein the data segment passed by the first service access point means comprises the connection control information and the data segment passed by the second service access point means comprises the data information.

3. The arrangement as defined in claim 1 wherein the control segment comprises a first data element corresponding to the address of a node of the plurality of nodes originating the packet, a second data element corresponding to the address of at least one node of the plurality of nodes intended to receive the packet, and a third data element corresponding to the address of a user entity, of the plurality of user entities, coupled to the at least one node identified by the second data element.

4. The arrangement as defined in claim 3 wherein the control segment further comprises a fourth data element corresponding to a hold level indicative of the relative importance of the data segment.

5. The arrangement as defined in claim 3 wherein the second data element comprises an array of flags, at least one flag in the array corresponds uniquely to each of the plurality of nodes.

6. The arrangement as defined in claim 5 wherein the receiving means, upon receiving a packet, clears the flag in the second data element that corresponds to the node to which the receiving means belongs.

7. An arrangement for communicating among a plurality of nodes in a packet network wherein each node connects a plurality of user entities to the network, the arrangement comprising:
   means for receiving a packet including a data segment and a control segment, the data segment including information selected from the group consisting of connection control information and data information, the receiving means including means for routing the data segment of a received packet to a predetermined one of the plurality of user entities in response to the control segment of the received packet;
   first means for transferring the data segment of a first packet between the receiving and transmitting means and a first one of the plurality of user entities; and
   second means for transferring the data segment of a second packet between the receiving and transmitting means and a second one of the plurality of user entities, the second transferring means operating independently of the first transferring means.

8. The arrangement as defined in claim 7 wherein the first and second transferring means each comprise independent means responsive to the relative importance of the data segment of a packet for selectively receiving the packet.

9. A method for coupling a plurality of nodes participating in a logical ring, the method comprising the steps of:
   specifying connections to be formed between the plurality of nodes to define a ring structure; and
   implementing the defined ring structure by establishing the specified connections using logical point-to-point connections, the logical point-to-point connections being formed across different types of physical transmission media.

10. The method as defined in claim 9 wherein:
   at least one of the plurality of nodes is coupled to a local area network.

11. The method as defined in claim 10 wherein a second one of the plurality of nodes is coupled to another one of the plurality of nodes by a logical point-to-point connection formed via telephone lines.

12. The method as defined in claim 9 wherein at least two of the plurality of nodes are coupled to each other by a logical point-to-point connection formed via telephone lines.

13. A method for coupling a plurality of nodes participating in a logical ring, each node including a protocol entity which connects a respective plurality of user entities to the logical ring, the method comprising the steps of:
   specifying connections to be formed between the plurality of nodes to define a ring structure;
   implementing the defined ring structure by establishing the specified connections using logical point-to-point connections;
   multiplexing onto the logical ring, for transmission from a first node of the plurality of nodes to a second node of the plurality of nodes, a packet including a data segment and a control segment, the data segment including information from a user entity connected at the first node; and
   demultiplexing the packet at the second node to pass the data segment to a user entity connected at the second node in response to the control segment of the packet.

14. The arrangement as defined in claim 13 wherein the control segment comprises a first data element corresponding to the address of the first node, a second data element corresponding to the address of at least the second node, and a third data element corresponding to the second user entity.

15. The arrangement as defined in claim 14 wherein the control segment further comprises a fourth data element corresponding to a hold level indicative of the relative importance of the data segment.

16. The arrangement as defined in claim 15 wherein a node, upon receiving a packet, clears the flag in the second data element that corresponds to the node receiving the packet.

17. The arrangement as defined in claim 14 wherein the second data element comprises an array of flags, at least one flag in the array corresponds uniquely to each of the plurality of nodes.

* * * * *